United States Patent [19]

Maas et al.

[11] Patent Number: 5,269,378
[45] Date of Patent: Dec. 14, 1993

[54] HOUSING ARRANGEMENT FOR FIRE-ENDANGERED INSTALLATIONS

[75] Inventors: Willi Maas; Dietmar Schte,uml/a/ pel, both of Cologne, Fed. Rep. of Germany

[73] Assignee: Bayer Aktiengesellschaft, Leverkusen, Fed. Rep. of Germany

[21] Appl. No.: 954,597

[22] Filed: Sep. 30, 1992

Related U.S. Application Data

[63] Continuation of Ser. No. 695,679, May 6, 1981, abandoned.

[30] Foreign Application Priority Data

May 19, 1990 [DE] Fed. Rep. of Germany ....... 4016160

[51] Int. Cl.$^5$ ................................................ A62C 2/06
[52] U.S. Cl. ......................................... 169/48; 169/54
[58] Field of Search ................... 169/26, 48, 54, 57

[56] References Cited

U.S. PATENT DOCUMENTS

| | | | |
|---|---|---|---|
| 3,864,883 | 2/1975 | McMarlin | 169/48 X |
| 4,419,535 | 12/1983 | O'Hara | 169/48 X |
| 4,424,867 | 1/1984 | Mallow | 169/48 X |
| 4,433,732 | 2/1984 | Licht et al. | 169/48 |

*Primary Examiner*—David M. Mitchell
*Assistant Examiner*—Andrew C. Pike
*Attorney, Agent, or Firm*—Sprung Horn Kramer & Woods

[57] ABSTRACT

Fire-endangered installations arranged in commercially available housings (1) are kept operable for longer on exposure to fire if they are covered, in the mounted state, by a protective housing (5) made from a fire-protection composition which foams up on exposure to fire.

9 Claims, 2 Drawing Sheets

HOUSING ARRANGEMENT FOR FIRE-ENDANGERED INSTALLATIONS

This application is a continuation of application Ser. No. 695,679, filed May 6, 1991, now abandoned.

The invention relates to a housing arrangement for fire-endangered installations, comprising a commercially available housing which, in the mounted state, is covered by a protective housing.

BACKGROUND OF THE INVENTION

In industrial plant, in particular in chemistry, but also in many other industries, there is a need to keep the equipment or equipment parts operable for as long as humanly possible in the event of fire, since equipments of this type often cannot be suddenly switched off, but must be slowly shut down. There is also a need for fire protection for much equipment in buildings, motor vehicles, aircraft and on ships. Examples of equipment worthy of protection are often measuring, control and regulation units and equipment, electricity supply stations, in particular emergency generators, tachographs, flight recorders and the like.

If any second housing was hitherto provided or prescribed as a protective housing, it did not offer a sufficient guarantee of fulfilling the abovementioned requirement. Commercially available housings and also protective housings are produced from thermoplastics or thermosets and are tested for flame resistance in accordance with DIN 4102, or they comprise metal. With rising temperature, thermoplastic materials are converted from the elastic to the plastic, pulpy or even liquid state. Thermosets remain hard on repeated warming and their heat resistance is generally from $-40°$ to $+130°$ C. higher than that of thermoplastics. Although metallic housings are fire-resistant, the outside temperature acting on them is very rapidly transferred into the interior, so that plastic parts, in particular line cladding and insulation, arranged in the housing carbonise and render the installation inoperable.

The object is to improve the housing arrangement of the type mentioned in the introduction with respect to the duration of operation when exposed to fire.

This object is achieved by a protective housing comprising a fire-protection composition which foams up when exposed to fire.

SUMMARY OF THE INVENTION

The present invention relates to a housing arrangement for fire-endangered installations comprising a housing which, in the mounted state, is covered by a protective housing characterised in that the protective housing comprises a foamable fire-protection composition which foams up when exposed to fire.

BRIEF DESCRIPTION OF THE DRAWINGS

The drawing shows a purely diagrammatic representation of the novel housing arrangement, for example for an electrical distributor station.

Figure 1:
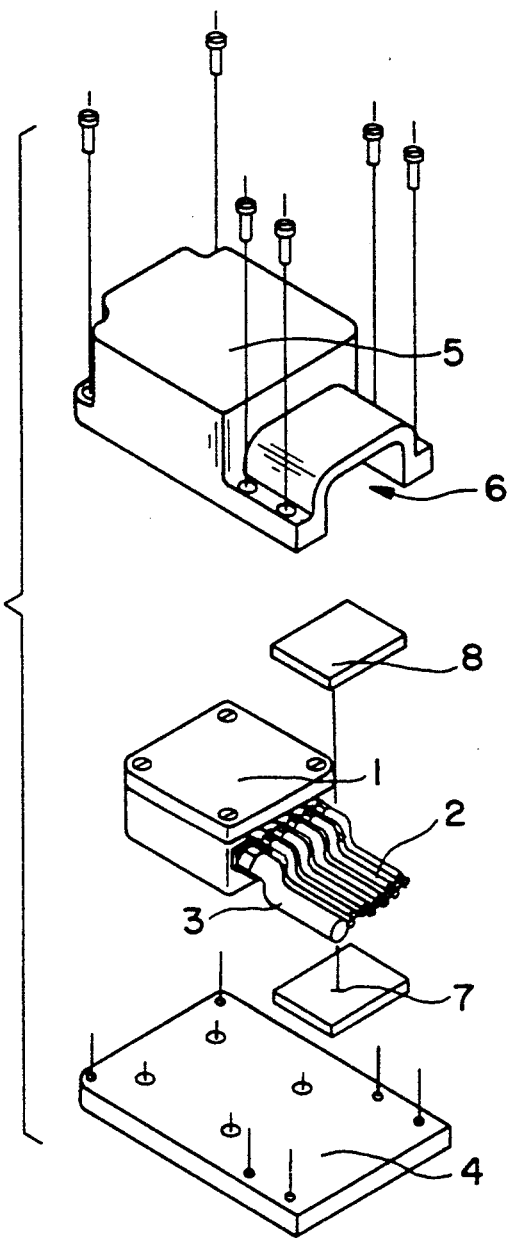
FIG. 1 shows an exploded view of the housing arrangement.
Figure 2:
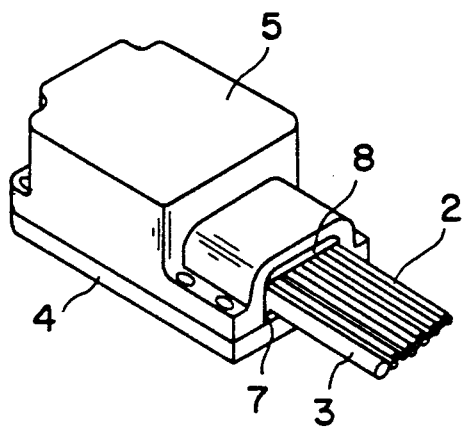
FIG. 2 shows a perspective view of the housing arrangement in the mounted state.

Cables 2 and a pipe 3 lead into the distributor station surrounded by an (inner) commercially available housing 1 made from a thermoset material. The housing 1 is mounted on a mounting plate 4 made from a polyurethane-based fire-protection composition and is surrounded by a protective housing 5 made from the same fire-protection composition. The thickness of the mounting plate 4 and the wall thickness of the protection housing 5 are 20 mm.

The inlet orifice 6 for the cables 2 and the pipe 3 is filled by two soft-elastic intermediate layers 7, 8 made from a fire-protective composition which match the contours.

DESCRIPTION OF THE INVENTION

Surprisingly, experiments have shown that the heating or destruction of the inner housing is greatly delayed by the foaming of the fire-protection composition of the protective housing, so that at least sufficient time remains, in "normal" breakdowns caused by exposure to fire, for the plant to be shut down as required by the process. The temperature in the installation space of the inner housing remains relatively low, so that carbonisation of installation parts does not occur. It goes without saying that all mountings of the inner housing should be within the protective housing. The protective housing may surround the inner housing at a distance or be in contact therewith. In the latter case, it must be matched to the shape of the inner housing, which is only worthwhile in the case of relatively large production runs.

Depending on the delay duration desired, a wall thickness of the protective housing of, preferably, between 3 and 50 mm will be chosen.

According to a particular embodiment, an associated mounting plate is also made from a fire-protection composition.

Here, the same fire-protection composition as chosen for the protective housing is advantageously chosen, and the thickness of the mounting plate can also be chosen in accordance with the required properties.

The inlet orifices for cables or pipes are preferably packed with a plastic fire-protection composition.

This is either a kneadable composition or elastically deformable plate-like intermediate layers.

According to a variant, intermediate layers made from fire-protection composition which are provided with recesses for cables or pipes are arranged in the inlet orifices.

In this case, the intermediate layers may be rigid.

Polymer systems which can be used to produce the novel fire-protection housing may be, for example, phenolic resins, urea resins, melamine resins or, in particular, epoxy resins and polyurethane resins, the object of these systems being to form a carbon foam in the event of fire or, preferably, to foam up in the event of fire and subsequently to form a heat-insulating and fire-resistant carbon foam.

The epoxy systems which foam up in the event of fire and from which the protective housing can be produced are described in DE-OS (German Published Specifications) 3,303,702 and 3,540,524.

The preferred polyurethane systems which foam up in the event of fire are prepared from the following starting components.

1. Aliphatic, cycloaliphatic, araliphatic, aromatic and heterocyclic polyisocyanates, as described, for example, by W. Siefken in Justus Liebigs Annalen der Chemie, 562, pages 75 to 136, for example those of the formula Q(NCO)$_n$, in which
n=2 to 4, preferably 2, and
Q denotes an aliphatic hydrocarbon radical having 2 to 18, preferably 6 to 10, C atoms, a cycloaliphatic hydrocarbon radical having 4 to 15, preferably 6 to 10, C atoms, an aromatic hydrocarbon radical having 6 to 15, preferably 6 to 13, C atoms or an araliphatic hydrocarbon radical having 8 to 15, preferably 8 to 13, C atoms, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate, and any desired mixtures of these isomers, 1-isocyanato-3,3,5-trimethyl-5-isocyanatomethyl-cyclohexane (German Auslegeschrift (German Published Specification) 1,202,785, U.S. Pat. No. 3,401,190, 2,4- and 2,6-hexahydrotolylene diisocyanate and any desired mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and any desired mixtures of these isomers, diphenylmethane 2,4'- and/or -4,4'-diisocyanate and naphthylene 1,5-diisocyanate.

Examples of other compounds which are suitable according to the invention are: triphenylmethane 4,4',4''-triisocyanate, polyphenyl-polymethylene polyisocyanates, as obtained by anilin-formaldehyde condensation and subsequent phosgenation and as described, for example, in British Patent Specifications 874,430 and 848,671, m- and p-isocyanatophenylsulphonyl isocyanates as described in U.S. Pat. No. 3,454,606, perchlorinated aryl polyisocyanates, as described, for example, in German Auslegeschrift (German Published No) 1,157,601 (U.S. Pat. No. 3,277,138), polyisocyanates containing carbodiimide groups, as described in German Patent Specification 1,092,007 (U.S. Pat. No. 3,152,162) and in German Offenlegungsschriften (German Published Specifications) 2,504,400, 2,537,685 and 2,552,350, norbornane diisocyanates, as described in U.S. Pat. No. 3,492,330, polyisocyanates containing allophanate groups, as described, for example, in British Patent Specification 994,890, Belgian Patent Specification 761,626 and Dutch Patent Application 7,102,524, polyisocyanates containing isocyanurate groups, as described, for example, in U.S. Pat. No. 3,001,973, German Patent Specifications 1,022,789, 1,222,067 and 1,027,394, and in German Offenlegungsschriften (German Published Specifications) 1,929,034 and 2,004,048, polyisocyanates containing urethane groups, as described, for example, in Belgian Patent No. 752,261 or in U.S. Pat. Nos. 3,394,164 and 3,644,457, polyisocyanates containing acylated urea groups, as described in German Patent Specification 1,230,778, polyisocyanates containing biuret groups, as described, for example, in U.S. Pat. Nos. 3,124,605, 3,201,372 and 3,124,605 and in British Patent Specification 889,050, polyisocyanates prepared by telomerisation reactions, as described, for example, in U.S. Pat. No. 3,654,106, polyisocyanates containing ester groups, as mentioned, for example, in British Patent Specifications 965,474 and 1,072,956, in U.S. Pat. No. 3,567,763 and in German Patent No. 1,231,688, products of the reaction of the abovementioned isocyanates with acetals, as described in German Patent Specification 1,072,385, and polyisocyanates containing polymeric fatty acid esters, as described in U.S. Pat. No. 3,455,883.

It is also possible to employ the distillation residues containing isocyanate groups which are produced in the industrial preparation of isocyanates, optionally dissolved in one or more of the abovementioned polyisocyanates. It is furthermore possible to use any desired mixtures of the abovementioned polyisocyanates.

Particular preference is generally given to the polyisocyanates which are readily accessible industrially, for example, 2,4- and 2,6-tolylene diisocyanate and any desired mixtures of these isomers ("TDI"), but in particular polyphenyl-polymethylene polyisocyanates, as prepared by anilin-formaldehyde condensation and subsequent phosgenation ("crude MDI"), furthermore polyisocyanates containing carbodiimide groups, urethane groups, allophanate groups, isocyanurate groups, urea groups or biuret groups ("modified polyisocyanates"), in particular those modified polyisocyanates derived from 2,4- and/or 2,6-tolylene diisocyanate or from 4,4'- and/or 2,4'-diphenylmethane diisocyanate.

2. Phosphorus-containing condensation products containing at least two hydroxyl groups, as can be obtained, for example, by condensation of primary or secondary aliphatic, cycloaliphatic, aromatic, araliphatic or heterocyclic monoamines and/or polyamines, optionally containing OH groups, carbonyl compounds and dialkyl phosphites, optionally with subsequent oxalkylation. Condensation products of this type are known per se, for example from German Patent Specification 1,143,022, U.S. Pat. No. 3,076,010, DE-AS (German Published Specification) 1,803,747 and DE-AS (German Published Specification) 1,928,265.

Phosphorus-containing condensation products containing at least two hydroxyl groups which are preferred according to the invention are those of the formula (RO)$_2$RO—CH$_2$—N=(CHX—CHX—OH)$_2$ in which
R denotes C$_1$–C$_8$-alkyl or C$_1$–C$_8$-hydroxyalkyl, preferably ethyl or hydroxyethyl, and
X denotes H or methyl, preferably H.

3. Polyethers having a functionality of more than 2 and having an average OH number of 150 to 500 which have been obtained by the addition reaction of alkylene oxides comprising 50 to 100% by weight of ethylene oxide with Zerewitinoff-active low-molecular-weight initiators. Polyethers having OH numbers of about 200 to 400 are particularly preferred.

"Having a functionality of more than two" also means that bifunctional polyethers may be mixed with trifunctional and/or higher-functional polyethers. A functionality of 2.5 to 4 is preferred.

Although the preferred polyethers are products of the addition reaction of ethylene oxide, it is in principle also possible to replace up to about 50% by weight of the adducted ethylene oxide by propylene oxide or other alkylene oxides, but an impairment in the intumescent and fire behaviour of the intumescent compositions must be expected, so that the concomitant use of polyethers, in the preparation of which, in addition to ethylene oxide, other alkylene oxides, for example propylene oxide, can be used, is less preferred.

The polyethers are prepared by methods known to a person skilled in the art, and which are conventional in polyether chemistry.

Suitable low-molecular-weight initiator molecules are the compounds which are known per se for the preparation of polyethers, for example water, ethylene glycol, propylene glycol, butanediol, trimethylolpropane, glycerol, triethanolamine, pehtaerythritol, ethylenediamine, toluylenediamine, a wide variety of sugars and hydrogenation products thereof, formoses and formitols, aniline, polyalkylenepolyamines, benzidines and hydrogenation products thereof, aniline-formaldehyde condensates and hydrogenation products thereof. Other possible initiators are aliphatic and aromatic polycarboxylic acids, as are amino acids or amino alcohols, such as ethanolamine.

4. Melamine and/or derivatives thereof, i.e. also cyanuric acid or compounds regarded as cyanuric acid or isocyanic acid derivatives. Examples are cyanamide, dicyanamide, dicyandiamide, guanidine and salts thereof, biguanide, melamine cyanurate, cyanuric acid salts and cyanuric acid esters and amides, in particular melamine, which is preferred due to its ready accessibility Melamine is preferably taken to mean the basic structure 2,4,6-triamino-s-triazine, but, for example, condensation products thereof obtainable by thermal treatment or by reaction with formaldehyde are also possible.

Of particular interest as melamine derivatives are salts thereof with organic and inorganic acids, such as oxalic acid, haloacetic acids, HBr, sulphuric acid, molybdic acid, boric acid, but in particular with phosphoric acids or polyphosphoric acids, i.e. derivatives of the melamine phosphate type.

These are preferably taken to mean products of the reaction of 1 mol of melamine with 0.01 to 2.5, preferably 0.5 to 1.0, mol of ortho-phosphoric acid. However, it is also possible for other phosphoric acids, such as, for example, meta-, pyro- or polyphosphoric acid, or those containing phosphorus in a different oxidation state, are also possible. The phosphates are prepared, for example, by reacting melamine with $H_3PO_4$ in aqueous suspension at 10° to 120° C., cooling and filtering the reaction mixture, and drying the product. Mixtures of melamine with melamine phosphates having a high phosphoric acid content can be used instead of melamine phosphates having a low phosphoric acid content.

However, it is generally understood that phosphates called "phosphates of the melamine phosphate type" here are also those which prove to be soluble in water to the extent of less than 5% by weight, preferably less than 1% by weight (in the form of the saturated solution at room temperature) and are produced, if appropriate, by the addition reaction of phosphoric acids with compounds known as cyanuric acid derivatives, for example with cyanamide, dicyanamide, hydrazodicarboxamide, dicyandiamine, guanidine and salts thereof, biguanide, urazole, urazole cyanurate, melamine cyanurate, cyanuric acid salts and cyanuric acid esters and amides, in particular melamine, which is preferred due to its ready accessibility.

5. Water is an optional component of the polyurethane system.

It has been found that the stoichiometric ratios which are customary for conventional polyurethane chemistry are not characteristic for the fire-resistant properties of the polyurethane systems used for the novel protective housing. Instead, components 2, 3, 4 and, if used, 5 are combined, disregarding the stoichiometry required with reference to isocyanate chemistry, and the mixture obtainable in this way is reacted in simple preliminary experiments with various amounts, within the amount latitude given according to the invention, of the polyisocyanate in order to empirically determine the desired optimum effectiveness.

The guide amounts found in this way for the individual components 2, 3, 4 and, if used, 5 in the reaction mixture to be reacted with the polyisocyanate add up to 100% and are:

for phosphorus-containing condensation products containing at least two hydroxyl groups (2): 5 to 40, preferably 5 to 30, % by weight, for the polyethers (3): 5 to 60, preferably 10 to 50, % by weight, for the melamine derivatives (4): 5 to 40, preferably 10 to 30, % by weight, for water (5): 0 to 5, preferably 0 to 1.5, % by weight. 100 parts by weight of this reaction mixture are generally reacted with 35 to 90, preferably 35 to 65, parts by weight of the polyisocyanate. Larger amounts of isocyanate are also possible.

The density of the polyurethane systems used for the fire-protection covers may be between 200 and 1,100 $kg/m^3$, preferably between 300 and 800 $kg/m^3$.

It is possible to combine the various reaction components individually, but it is expedient to make a premix of the components 2, 3, 4 and, if used, 5 which are reactive with the polyisocyanates (component 1), thus obtaining, if necessary after brief warming, a liquid reaction component containing all the necessary constituents apart from the polyisocyanate. In this way, the covers can be formulated as a two-component mixture or produced therefrom. To this end, conventional equipment of polyurethane technology can be employed.

In order to bind water in the reaction mixture, anhydrous zeolites are suitable as the filler, in an amount as required.

The novel covers can be reinforced with fibres, wires or metal sheeting, or with woven materials, strands or nonwovens made from organic or inorganic materials or produced with a multilayer or sandwich structure in combination with other plastics, such as, for example, phenolic resins, urea resins, melamine resins or epoxy resins.

Figure 3:
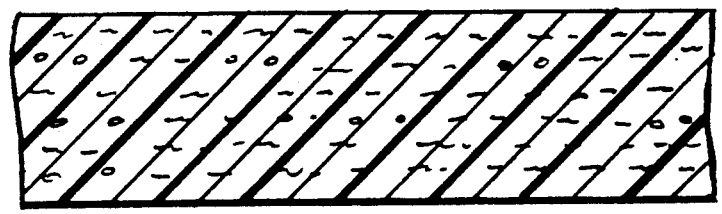
FIG. 3 shows a cross section of one embodiment of the foamable fire protection composition employed in the housing arrangement of the present invention.
Figure 4:
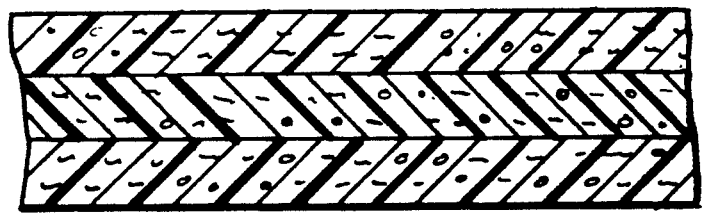
FIG. 4 shows a cross section of another embodiment of the foamable fire protection composition employed in the housing arrangement of the present invention.

FIGS. 3 and 4 show, respectfully, the fibre and filler reinforced structure, first as a homogeneous composition (FIG. 3) and then as a sandwich structure (FIG. 4).

Suitable fillers, alone or in combination are, in particular, aluminium oxide hydrates, chalk, kaolin, glass powder or solid or hollow beads made from silicate material, for example so-called microballoons. Aluminium oxide hydrates are preferred alongside hollow beads due to their dehydration capability.

Other fillers which can be used, in addition to mineral fibres, glass fibres, carbon fibres or organic fibres, are those which are in the form of granules, powders, rods, tapes, leaves, in a very wide variety of crystallite forms or those which can be in the form of a foam, sphere or hollow sphere.

Also of interest are fillers which can be dehydrated or which eliminate ammonia and themselves "consume" heat through a decomposition reaction or elimination of water or evaporation at temperatures between 100° C. and 700° C., preferably 120° C. and 400° C.

Examples of such fillers are alkali metal silicates, zeolites or other hydrated phosphates, silicates, borosilicates or borates, aluminium oxide hydrates, cyanuric acid derivatives and analogues, as mentioned, for example, in European Patent Specification 116 846, phenol-, melamine- and urea-formaldehyde resins, expandable graphites and mica, vermiculite and perlite, minerals containing water of crystallisation, such as aluminohydrocalcite, artinite, dawsonite, ettringite, hydrocalumite, hydroganate, hydromagnesite, hydrotalkite, nesquehonite, scarbroite, thaumasite and wermlandite. However, aluminium hydroxides, aluminium oxide hydrates or hydrated clays are of particular interest.

The following components are used to prepare the fire-protection composition:

The polyisocyanate (1) is a commercially available technical-grade polyisocyanate isomer mixture obtained by phosgenation of anilin-formaldehyde condensates and containing about 65% of bicyclic diisocyanates and about 35% of polycyclicpolyisocyanates, the phosphorus-containing condensation product (2) used is technical-grade $(C_2H_5O)_2PO.CH_2N(C_2H_4OH)_2$, called P-diol (2) here, the polyether (3) used was an ethylene oxide/glycerol adduct prepared by alkali catalysis in accordance with the prior art and having an OH number of 251, the melamin derivative (4) used was a product of the addition reaction of 0.75 mol of $H_3PO_4$ with 1 mol of melamin, prepared by combining the components in water and drying the reaction mixture at 130° C.

250 parts by weight of melamin derivative (4), 75 parts by weight of aluminium oxide hydrate and 225 parts by weight of ground glass fibres were added successively with vigorous stirring to a mixture of 500 parts by weight of polyether (3) and 300 parts by weight of P-diol (2). 743 parts by weight of polyisocyanate (1) were admixed with the resultant mixture over the course of 30 seconds.

The reaction mixture was immediately poured into an appropriate mould in order to produce the protective housing as shown in the drawing. The mould was immediately closed, and the mould cavity was filled by the foaming of the reaction mixture. After 15 minutes, the mould could be opened and the protective housing removed.

The wall thickness of the protective housing was 20 mm, and the density of the material was 620 kg/m³. As a fire-protection base plate for the two housings, a 20 mm thick plate with appropriate dimensions and a density of 620 kg/m³ was produced by the procedure described for the protective housing.

FIRE TEST

The fire-protection base plate and, on top of the latter, the commercially available electrical housing were attached to a lightweight concrete wall with a thickness of 10 cm. Inside the electrical housing, various cable pieces were connected to the electrical connectors. This inner housing was closed and covered by the protective housing, the inlet orifice for the cables was sealed, and the protective housing was attached by means of screws.

This housing arrangement was exposed for 30 minutes to a hydrocarbon fire in a fire oven in accordance with the so-called hydrocarbon curve of Mobil Oil, as described, for example, in British Standard BS 8202.

The inner housing was then opened, and it was seen that the connectors and cable pieces were undamaged and operable. Protective housings of this type are thus suitable for short-term use.

We claim:

1. A protective enclosure for fire-endangered installations comprising:
   a first housing (1) having a base surface and an outer surface;
   at least one cable or pipe connected to said first housing;
   a second housing (5) comprising a foamable fire-protection composition formed into a solid molded article having an inlet orifice for the cable or the pipe; and
   a mounting plate (4) made from the foamable fire-protection composition and mounted on the base surface of the first housing; wherein the outer surface of the first housing is covered at least in part by the second housing.

2. The protective enclosure according to claim 1, wherein the second housing (5) has a wall thickness of 3 to 50 mm.

3. The protective enclosure according to claim 1, wherein the inlet orifice for the cable or the pipe is packed with a plastically deformable, fire-protection composition.

4. The protective enclosure according to claim 1, wherein intermediate layers (7,8) made from a fire-protection composition are arranged in the inlet orifice (6) of the second housing for the cable or the pipe.

5. The protective enclosure according to claim 1, wherein the second housing is produced by a plastic molding process.

6. The protective enclosure according to claim 1, wherein the foamable fire-protection composition consists of a synthetic resin with filler and fibrous reinforcing material incorporated therein.

7. The protective enclosure according to claim 1, wherein the foamable fire-protection composition consists of layers of synthetic resin with filler and fibrous reinforcing material incorporated therein.

8. The protective enclosure according to claim 1, wherein the fire-protection composition is a polyurethane having a density from 200 to 1,100 kg/m₃.

9. The protective enclosure according to claim 1, wherein the foamable fire protection composition comprises a polymer resin selected from the group consisting of phenolic resins, urea resins, and melamine resins.

* * * * *

UNITED STATES PATENT AND TRADEMARK OFFICE
CERTIFICATE OF CORRECTION

PATENT NO. : 5,269,378
DATED : December 14, 1993
INVENTOR(S) : Mass, et al.

It is certified that error appears in the above-indentified patent and that said Letters Patent is hereby corrected as shown below:

Title Page     [75]  Inventors:  second Inventor delete
               " Schte,uml/a/pel " and substitute
               -- Schapel --

Title Page     [63]  Related U.S. Application Data: After
               May 6, " delete " 1981 " and substitute
               -- 1991 --

Signed and Sealed this

Seventeenth Day of September, 1996

Attest:

BRUCE LEHMAN

Attesting Officer        Commissioner of Patents and Trademarks